United States Patent [19]

Euzen et al.

[11] Patent Number: 6,090,351
[45] Date of Patent: Jul. 18, 2000

[54] MOVING BED CHAMBER WITH A REGULARIZED FLOW

[75] Inventors: Jean-Paul Euzen, Dardilly; Daniel Vuillemot, Saint Genis Laval; Roland Huin, Montesson la Borde, all of France

[73] Assignee: Institut Francais du Petrole, Cedex, France

[21] Appl. No.: 09/148,072

[22] Filed: Sep. 4, 1998

Related U.S. Application Data

[63] Continuation of application No. 08/590,292, Jan. 23, 1996, abandoned.

[30] Foreign Application Priority Data

Jan. 24, 1995 [FR] France ................................. 95 00867

[51] Int. Cl.$^7$ ........................................................ B01J 8/08
[52] U.S. Cl. ........................... 422/213; 422/216; 422/219; 422/220; 422/232; 422/233; 422/311
[58] Field of Search ..................................... 422/191, 213, 422/216, 219, 220, 232, 233, 311, 133, 141; 208/63–65, 113, 148, 152, 167; 201/32, 34, 786

[56] References Cited

U.S. PATENT DOCUMENTS

| | | | |
|---|---|---|---|
| 2,956,010 | 10/1960 | Buckner, Jr. .......................... | 208/166 |
| 3,706,536 | 12/1972 | Greenwood et al. ................. | 23/288 |
| 3,854,887 | 12/1974 | Heinze et al. ........................ | 23/288 |
| 4,277,444 | 7/1981 | Van Landeghem .................. | 422/191 |
| 4,498,973 | 2/1985 | Sikonia et al. ....................... | 208/63 |
| 5,130,106 | 7/1992 | Koves et al. ......................... | 422/216 |

FOREIGN PATENT DOCUMENTS

| | | |
|---|---|---|
| 2 137 772 | 12/1972 | France . |
| 2 427 378 | 12/1979 | France . |
| 90 14 347 | 2/1991 | Germany . |

OTHER PUBLICATIONS

Trambouze, P. "Reactor Scaleup Methodology," *Chemical Engineering Progress*, vol. 2, Feb., 1190.

*Primary Examiner*—Sikyin Ip
*Attorney, Agent, or Firm*—Millen, White, Zelano & Branigan

[57] ABSTRACT

A chamber comprising a moving bed of solid particles, delimited by at least one screen with thickness e, circulating in a downward direction substantially parallel to the screen, the bed being traversed by at least one fluid flowing in the bed in a principal direction which is different to that of the ensemble of particles and leaving the bed by an outlet screen. In accordance with the invention, the chamber comprises at least one opening for introducing solid particles located above the bed and comprising at least one orifice for the flow of the particles, located at a distance of at least 0.6 e from the outlet screen. The chamber advantageously comprises at least two extraction openings, one extraction opening being located at a distance not more than 0.5 e from the outlet screen, and the other at a distance of at least 0.5 e from the outlet screen. The invention is applicable to catalytic reactors, in particular to catalytic reforming reactors.

15 Claims, 2 Drawing Sheets

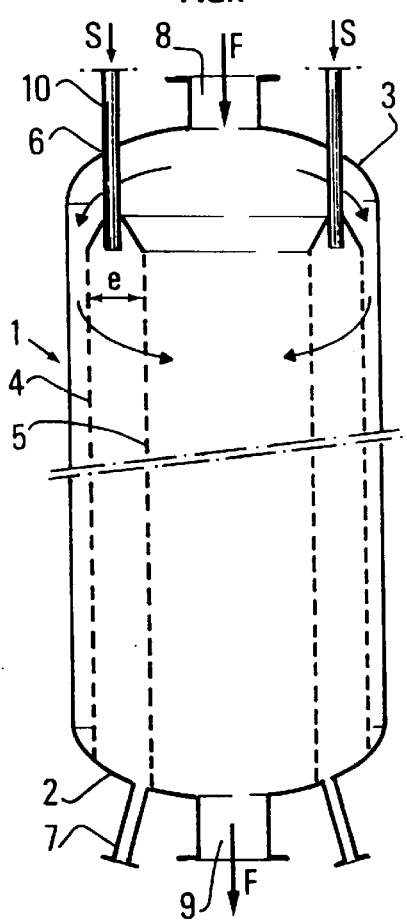
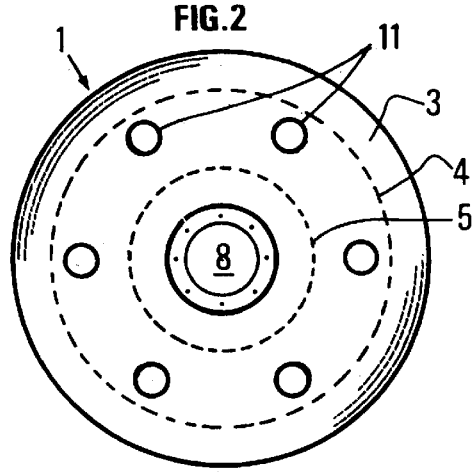
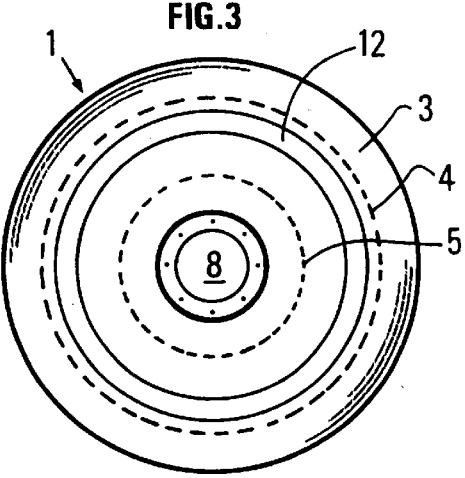
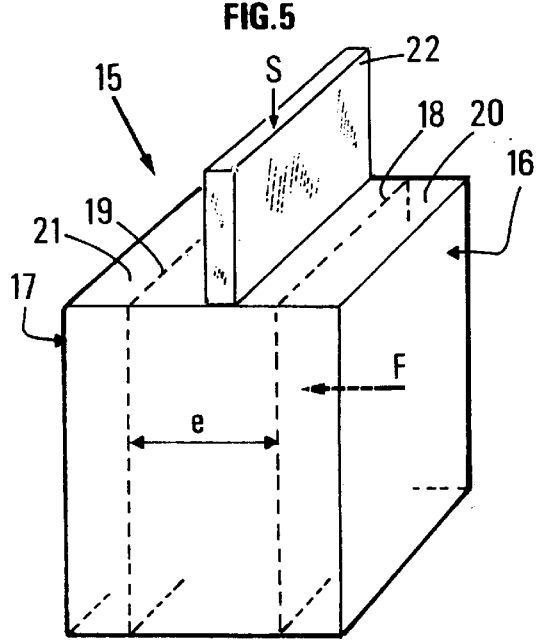
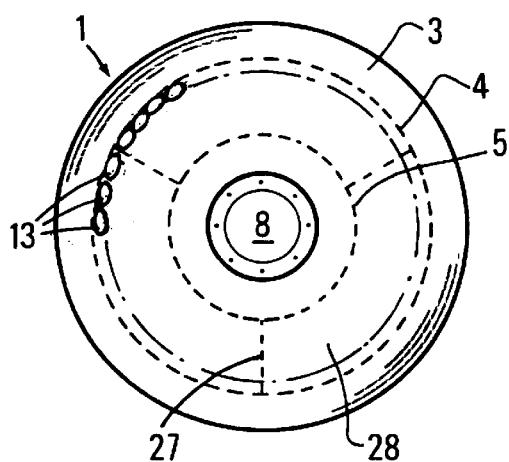

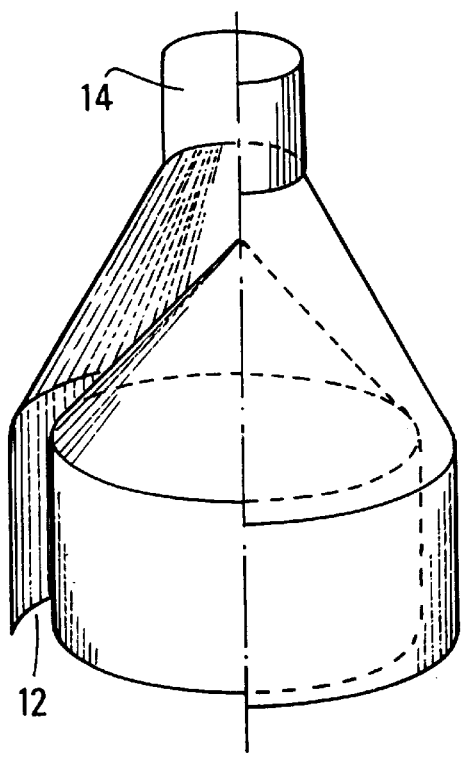
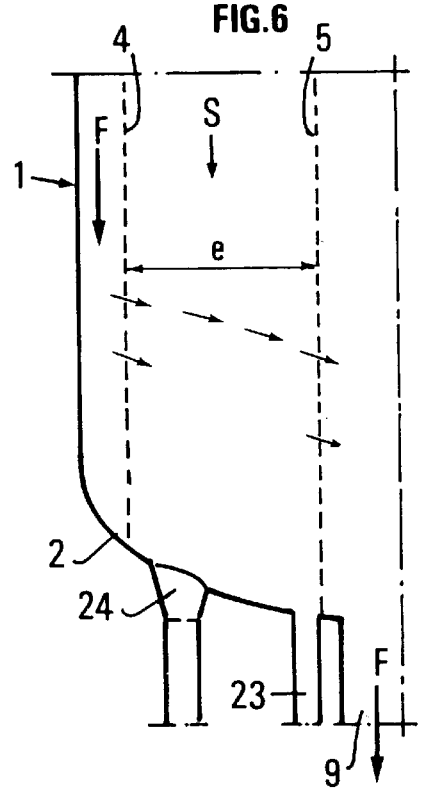
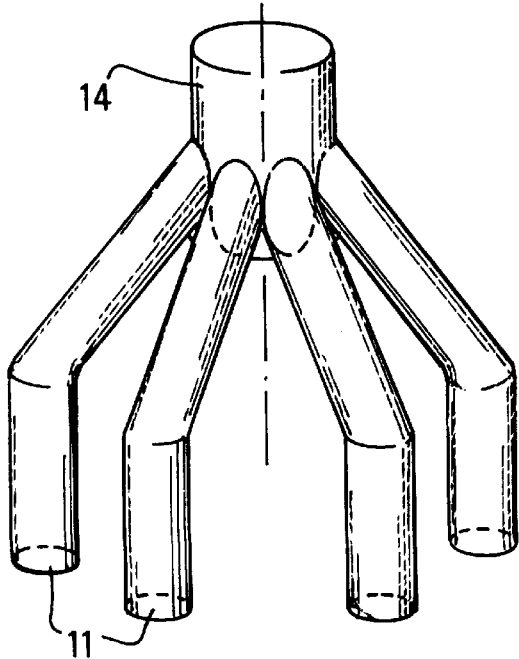
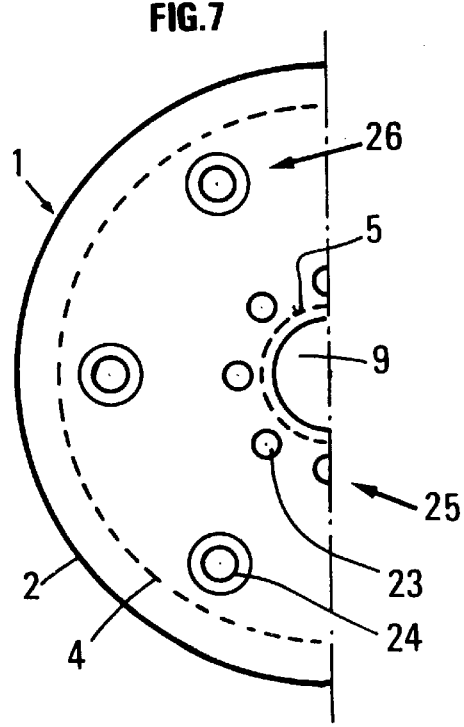

MOVING BED CHAMBER WITH A REGULARIZED FLOW

This is a continuation of application Ser. No. 08/590,292 filed Jan. 23, 1996, now abandoned.

BACKGROUND OF THE INVENTION

The invention concerns improvements to chambers in which a bed of solid particles flows, termed a moving bed. It is particularly applicable to moving bed reactors, in particular to moving bed catalytic reactors such as those used for catalytic reforming.

In moving bed units in which the solid, which may or may hot be catalytic, and may or may not be spherical, is circulated in a dense bed which flows vertically under gravity, the walls which delimit the granular zone usually comprise 2 cylindrical screens of differing diameters. The fluid, which may be liquid but is usually gaseous, or possibly the fluids (gas and liquid, or liquid and another non-miscible liquid) traverse the granular bed (annular in this case) as a cross-flow, i.e., a radial flow, from outside to the inside, or conversely from inside to outside. After passing through the cylindrical inlet screen, the fluid then traverses the bed, then leaves the annular space containing the granular medium by passing through a second screen, the outlet screen, which is concentric with the inlet screen.

The flow of the fluid(s) traversing the bed causes a pressure drop which depends on a number of factors, the major factors being the size and shape of the particles, the properties of the fluid or fluids and the flow rate of the fluid(s). This pressure drop causes a thrust by the fluid on the solid particles in the direction of flow of the fluid. This thrust is directed towards the outlet screen and modifies the balance of forces to which the solid particles are subjected (spherules, for example). This phenomenon causes problems, such as slowing the movement of the particles which are against the wall, or even causing them to jam against the outlet screen and completely stop, which both severely inhibits the function of these particles and can cause other particles to slow or stop and gradually completely block the bed (for example a catalytic bed) and completely halt the circulation of the solid. This phenomenon is all the more accentuated when the thrust on the fluid(s) is high and thus when the capacity of the unit is high.

Blocking thus constitutes an important limitation on increasing the capacity of the units. The development of arrangements and means to reduce the size of this phenomenon is thus of particular interest.

This problem is acute in catalytic units such as catalytic reforming units. The risk of the catalytic particles jamming against the screens severely reduces the flow rates of the gas to be treated and thus severely reduces the capacities of the units.

Further, during different treatments, in particular regeneration of the catalytic particles, or transfers between reactors or between reactors and regenerators, spherule fragments are formed which rapidly jam in the screens. This fragmented population thus accelerates blocking.

The presence and irregularity in the concentration of broken or small particles (substantially less than the average size of the particles) in some zones of an annular moving bed can cause a number of anomalies.

If there is a greater abundance of fine or broken particles in some zones, they locally reduce the porosity of the bed which limits the velocity of the fluid and thus prolongs the contact time of the fluid with the solid particles. In contrast, in zones which are depleted in fine particles, the porosity is higher and the fluid passes more easily and thus faster and has a smaller contact time with the solid. This heterogeneity in the contact time can cause a number of problems, in particular:

a) For the reaction fluid (in particular a gas):
  overall degrees of conversion which are lower than the values obtained in the presence of a regular, well distributed fluid flow;
  local lack of temperature equilibrium when the heat of reaction is not zero, and as a consequence;
  local variations in the nature and quantity of the products obtained, in particular secondary products, thus limiting the overall selectivity which is sought;

b) For the particles:
  local irregularities in the rate of flow of the fluids and local differences in the size distribution, and even the shape of the particles, modifying the flow characteristics of the bed, such that the downward movement of the various zones of the bed can become irregular, with the following principal consequences:
    particles which can move faster to the fluid outlet screen encrust themselves in the orifices of the screens and hence perturb sliding of the granular bed against the walls or block some zones which has a particularly deleterious effect on the performance of a moving bed unit;
    an increase in pressure drops through the fluid outlet screen.

There are further complications for catalytic particles, since:

irregularities in the fluid flow can cause substantial differences in the amplitude of the various deactivation phenomena caused by contact with the reactants, in particular poisoning or coking. This enhanced deactivation further reduces the efficiency of the catalyst in some zones and can then cause a reduction in the expected degree of conversion and the degree of selectivity;

an increase in the residence time of some particles of the bed also causes variations in deactivation of the catalytic particles, which reduces the overall performance of the unit.

SUMMARY OF THE INVENTION

The invention aims to solve these problems.

The aim of the invention is to regularise the flow of the solid particles by encouraging their distribution from the moment of their supply to the moving bed, by retarding or preventing the impact of the finest or broken particles against the fluid outlet screen and more advantageously by separately collecting a population of the particles which is concentrated in fine or broken particles from which the finest particles are separated.

The invention is particularly suitable for solid particles with an average diameter in the range 0.1 to 6 mm, preferably in the range 1.5 to 3.5 mm, more preferably in the range 1.5 to 3.2 mm.

More precisely, the invention concerns a chamber delimited by at least one wall, comprising:

at least one screen delimiting a moving bed of solid granular particles of thickness e, which may or may not be constant, which circulates in the chamber in a downward direction substantially parallel to the screen;

at least one opening for the introduction of at least one fluid which circulates in said bed in a principal direction which is different to that of the ensemble of particles and leaves the bed via at least one outlet screen;

at least one means for extracting the particles from the chamber;

at least one opening for the introduction of particles into the chamber, via at least one means for distributing said particles, said means being located above the moving bed of particles and said means comprising at least one orifice for the stream of particles, each orifice(s) being located at a distance of at least 0.6 e from the outlet screen.

The term "chamber" means a reactor, silo . . . , or more generally a zone delimited by at least one wall. It is normally a reactor (such as a reactor for catalytic reforming or for another chemical reaction) with a vertical axis and comprising a cylindrical wall, a bottom and a roof.

Examples of other suitable forms of reactor are those described in U.S. Pat. No. 5,013,425 which comprise a set of parallel compartments containing a catalytic bed.

A moving bed of solid particles is formed in the chamber, and the particles are supplied by means of at least one opening. They exit by at least one opening.

In the chamber, the particle bed can be delimited:

by a screen and a wall. This is the case, for example, when the screen is cylindrical and the bed circulates between the cylindrical wall of the reactor and the screen;

by at least two screens, an inner screen and an outer screen. Preferably, the screens are parallel in pairs or concentric. This is the case, for example, with two cylindrical screens located concentrically along the reactor axis, the bed circulating between the screens.

The overall flow of the ensemble of particles is along at least one screen, i.e., the direction of this flow is substantially parallel to that screen. The aim, of course, is to limit rubbing of the particles against the screen, and thus any jamming thereof.

The term "substantially parallel" has been used to take into account the difficulty in controlling a direction strictly parallel to that flow but in which the overall movement of the ensemble is parallel to the chamber axis.

At least one fluid is introduced into the chamber and traverses the moving bed, leaving via the screen(s) (outlet screen). The invention is particularly advantageous in the case where the fluid(s) circulate in the particle bed with a principal direction which is different to that of the ensemble of particles. In other words, the thrust caused by the fluid counters the intended motion of the moving bed.

This is often the case for radial fluid flows. The change in the direction of flow of some particles, caused by the fluid, brings these particles against the screens where they can jam.

The invention thus consists of moving the particle introduction zone away from the fluid outlet screen.

Thus, for example, if the fluid leaves via a central collector, the particles are introduced from above the bed, near the peripheral zone; if, on the other hand, the circulation direction of the fluid(s) is centrifugal, from the central zone to the peripheral zone, it is recommended that the particles are introduced close to the central zone.

There is, in effect, a difference in the behaviour of particles which fall from a supply orifice which is substantially a point to form a slope, which is natural or delimited by the side walls and piles up. While the large particles tend to roll towards the base and outside of the slope, the finer particles or some of the broken particles find the gaps in the framework of the pile where they can introduce themselves, slide, become trapped and remain. This results in an average particle diameter distribution in the slope which is not regular, but has a large proportion of smaller particles close to the point vertical to the supply point and a smaller proportion of these particles with increasing distance from the axis of the slope or the point vertical to the injection point towards the periphery of the slope.

The distribution means provided for the chamber of the invention can maximise the radial distance between the point vertical to each orifice for the introduction of particles and the fluid outlet screen to reduce the probability of finding fine particles close to the outlet screen or jammed against the outlet screen. In order to achieve this, it is recommended that the axis of the particle supply orifices is offset by as much as possible from the axis of the fluid outlet screen.

In accordance with the invention, the distance between the outlet screen and each orifice for the stream of particles is at least 0.6 e, preferably at least 0.75 e; e is the thickness of the bed in its middle plane closest to said orifices.

The term "middle plane" of the bed means a plane which is substantially perpendicular to the direction of flow of the ensemble of particles.

The effect of the invention is reinforced in the case of a bed which is delimited by two concentric screens with a fluid flow from the peripheral zone towards a central collector delimited by the outlet screen. When the gas circulates from the peripheral zone towards the central zone, the introduction of particles close to the peripheral zone has a further advantage. Since the velocity of the fluid increases from the outer screen (or from the fluid introduction openings) towards the inner screen (or outlet screen), the introduction of particles close to the exterior of the bed subjects them to smaller velocities and thus reduces the forces on the introduced particles, in particular on fine or broken particles, which entrain them towards the inner screen of the central collector. This process further limits the migration of fine or broken particles towards the central collector.

In a further aspect, the phenomenon of heterogeneous distribution of particles at the head of the bed also occurs in the peripheral, or tangential, direction (perpendicular to the radial direction). This has the problem of leading to an irregular distribution of porosity and particle diameter around the circumference of the bed. This peripheral distribution is approximately periodic in nature, mirroring the periodicity of the supply tubes or orifices. This heterogeneity results in a heterogeneity in the flow of the fluid(s) passing through the bed, as regards velocities, also contact times and all the transfer processes (mass or heat). This phenomenon occurs in all geometries of the moving bed.

The invention can reduce or eliminate this approximately periodic heterogeneity by supplying the head of the granular bed via a single orifice or via a series of a plurality of orifices, which are preferably elliptical in shape.

Distribution about the circumference of the bed or the length of the bed (the dimension parallel to the outlet screen) is better when there is a number of orifices.

In a preferred embodiment, the orifices are connected consecutively (they touch each other).

In a further advantageous embodiment, a distribution means is used which has a single orifice for the stream of particles. This orifice is annular in shape and has the same axis as the bed in the case of an annular bed and is rectangular in shape in the case of a parallelepipedal bed. This orifice is preferably located in the proximity of the circumference of the bed at the fluid inlet screen side of the bed.

The orifices are preferably elliptical in cross section (for example tubes with elliptical cross sections) with the major axis oriented along the circumference of the outlet screen (or the minor axis of the ellipse oriented radially), the major axis being as long as possible and advantageously being joined to that of the immediately neighbouring orifice(s).

The ensemble of the orifices thus form a particle distribution means. Several distribution means can be used, each comprising a portion of the ensemble of orifices. As an example, one means can comprise orifices located at a distance between 0.6 and 0.75 e from the outlet screen, and a further means can comprise orifices located at a distance of more than 0.75 e.

It is clear that the effect of the invention will be more accentuated when the orifices are at a distance of about e from the outlet screen.

It is also clear that the distribution means is/are located at least in part in the chamber (orifices) but its/their connection to the particle supply can be inside or outside the chamber.

In addition to the distribution means described, the chamber of the invention can also advantageously be used with a specific particle extraction means which can control the regularity of the flow of fine and/or broken particles in the bed and thus they can be evacuated separately to reduce their proportion in the stream of particles transferred to the downstream bed.

Regularity of particle flow is indispensable so that all the particles are used in the same manner and can thus have a similar residence time and hence deactivation. However, this flow regularity is difficult to obtain, in particular at the bottom of the reactor, when the cross section traversed by the bed reduces very rapidly to the cross section of the extraction orifices. This problem is more difficult when the extraction orifices are displaced towards the centre of the reactor since some particles describe a long and oblique path before reaching these orifices. The velocity profile of the particles at the bottom of the reactor is often quite unsymmetrical. In particular, there are quite fast velocities at the points vertical to the extraction points, but they are much lower in zones which are the furthest laterally from the extraction orifices. The particles which flow through these zones thus remain longer in the reactor than those which are close to the central collector; they are thus more strongly deactivated, and in particular more coked, which has a deleterious effect on unit efficiency.

The presence of broken spherules or spherules with an equivalent diameter which is much lower than the average of the particles present in the bed, leads to variable porosities in the moving bed, and thus to irregular circulation of the fluid traversing it, and also to the risk of these particles jamming against the inlet screens and in particular the fluid outlet. These problems can cause a disparity in the velocities of the fluid traversing the bed and thus in the working efficiency of some zones of the bed. They can also slow the systematic circulating movement of the particles in these zones, which is again deleterious to the efficiency of the catalytic mass and the reactors.

The present invention thus provides a chamber as defined above and comprising at least one extraction means, preferably two extraction means for the particles, to evacuate at least two particle streams.

Multiplying the extraction points and distributing them over the entire width of the space (for example annular) occupied by the mobile bed means that several drainage zones can be provided. Since the particle velocities are highest at the axis of the extraction points and decrease progressively further away therefrom, it is of advantage to distribute these points as regularly as possible, in particular, in the case of an annual bed, to provide a number of points close to the periphery of the bed.

Regularization of the bed flow is thus very substantially improved.

Preferably, the chamber comprises an extraction means located at a distance of at most 0.5 e from the outlet screen, preferably at most 0.4 e, or at most 0.25 e.

When this extraction means is used in combination with another further extraction means further from the outlet screen, it will generally collect a stream of particles which is more concentrated in fine and/or broke particles than the particle stream entering the chamber.

The stream collected in the other extraction means will then be less concentrated in fine and/or broke particles.

Clearly, different embodiments are possible. Advantageously, a plurality of extraction means are located at a distance of at least 0.5 e from the outlet screen (preferably at least 0.75 e) to collect a particle population which is less concentrated in fine or broken particles than near the central collector (outlet screen) and thus acts as a particle pre-sorter. The particles extracted at the periphery can then be sent as normal, without any particle treatment, to the downstream reactors, receptacles or apparatus. The remaining particles can then leave the chamber directly via an extraction means constituted by the particle evacuation opening. They can then be directed to a particular sorting or separation apparatus which can, for example, eliminate fine or broken particles before rejoining the normal particle circulation circuit.

In a further embodiment, a plurality of extraction means is located at a distance of at most 0.5 e from the outlet screen to collect a particle stream which is concentrated in fine and/or broken particles, while the remainder of the particles is evacuated using one or more extraction means, which is/are advantageously located at a distance of at least 0.5 e from the outlet screen (preferably at least 0.6 or at least 0.75 e). Preselection of particles is thus obtained.

The movement of particles in the bed is in a downward vertical direction overall, but the circulation of gas, for example from the outlet screen (periphery) towards the outlet screen (central collector) tends to push broken or the finest particles towards the center. As a result, the proportion of fine or broken particles is higher near the fluid outlet zone (the centre) than near the fluid inlet zone (outer wall). Differential extraction from the periphery or from near the collector thus profits from this concentration difference to offer the possibility of treating two populations differently. It is thus possible to send the particles which are extracted from near the fluid inlet (at the periphery) directly to the downstream reactor, without any particular treatment, while the particles extracted from near the fluid outlet (central collector) can undergo a particular treatment to reduce the proportion of fine or broken particles, or even to eliminate them completely before sending them to the downstream reactors, receptacles or apparatus. When the stream has been differentiated, it can of course follow a circuit which is completely or partially different to that of the other particles.

The explanation given here for an annular bed with a centripetal fluid circulation is similar for a bed with fluid circulating in the opposite direction or of a different shape, for example parallelepipedal.

By regulating the extraction flow rates in each of these zones, it is possible to treat, if necessary, a larger or smaller fraction of the total flow of particles.

The (at least one) extraction means can be constituted simply by a tube, with a cross section which is circular, elliptical . . . , collecting particles via its upper orifice and directing them to an opening in the chamber which evacuates the particles.

Advantageously, these tubes are at least in part connected to collect the desired particle stream and evacuate them together via at least one opening in the chamber.

The (at least one) extraction means can comprise a single annular orifice with the same axis as the bed, and then has the form of a ring which is open at its upper portion to collect the particles, the particles then being directed to at least one opening in the chamber for evacuation.

Preferably, the extraction means are distributed in accordance with the bed symmetry. As an example, for a chamber with a bed of annular cross section, the extraction means are distributed along at least one circular line.

As described above, an extraction means can be constituted by the opening in the chamber itself.

In the case of a moving bed of parallelepipedal shape, at least one extraction means can comprise a single orifice of rectangular cross section with the same axis as the bed.

The invention is also applicable to a moving bed circulating in the volume delimited between two concentric screens, the fluid traversing the bed from the periphery (screen with the largest diameter) to the centre, the smaller diameter screen thus forming a central collector via which the fluid is evacuated.

The invention is more advantageous for a moving bed which is cut into sectors, for example by means of at least one (or two) wall placed in the bed in a direction which is substantially parallel to the direction of flow of the particles and substantially parallel to the direction of fluid flow. In the case of an annular bed, for example, there would be wall(s) between the inlet and outlet screens.

Preferably, above each sector, the wall comprises at least one particle distribution means located at a distance of at least 0.5 e from the outlet screen, and at the lower portion of the bed, it comprises at least one and advantageously 2 extraction means per sector.

The invention is advantageous in that it permits the separate regulation of the particle flow rates at the distribution means, each distribution means being provided with a means for regulating the flow rate of particles passing through it, and also permits separate extraction by sectors of the particles and thus control of the regularity of the flow of the bed by sectors. In this case, the operator selects the distribution means and the extraction means (number of orifices, geometry . . . ) by sector depending on those needs.

The invention will be better understood from the following figures:

FIG. 1: a cylindrical reactor with two screens; shown here is a typical moving bed reactor for catalytic reforming, which is given by way of illustration and is not limiting;

FIG. 2: a top view of a distribution means of FIG. 1;

FIG. 2A: a perceptive view of a distribution means of FIG. 2;

FIG. 3: a distribution means with a single annular orifice;

FIG. 3A: a perspective view of a distribution means of FIG. 3;

FIG. 4: a distribution means with consecutive connected orifices;

FIG. 5: a parallelepipedal chamber with two screens; and

FIGS. 6 and 7: views of extraction means.

DESCRIPTION OF THE PREFERRED EMBODIMENTS

In FIG. 1, the reactor constituting the chamber comprises a cylindrical wall 1, a bottom 2, a roof 3, an outer cylindrical screen 4 along the reactor axis and an inner cylindrical wall 5 which is concentric with screen 4 but with a smaller diameter.

Solid particles S are introduced via at least one opening 6 in the roof and leave from the bottom of the chamber via at least one opening 7. The moving bed circulates between the two screens.

Fluid F is introduced via at least one opening 8, traverses the bed and is collected in the inner volume delimited by screen 5, leaving the reactor via at least one opening 9 in the lower portion of the reactor. The fluid traverses the bed in a direction which is very different to the flow of the ensemble of particles.

In this figure, opening(s) for the introduction and exit of the fluid are located so as to cause the fluid to circulate in the annular space delimited by the wall of the chamber and the outer screen of larger diameter towards the inner volume delimited by the smaller diameter screen, from which it exits.

In accordance with the invention, the particles are introduced via at least one distribution means 10 which is shown in simplified fashion in the top view of FIG. 2.

The means is constituted by six tubes 11 with circular cross sections, at least at their orifice which opens onto the bed. The orifices are distributed about the bed circumference, and the distribution is regular.

They (their centres) are located at a distance of at least 0.5 e from the outlet screen 5, e being the thickness of the bed, i.e., the distance between the two concentric and parallel screens 4 and 5.

FIG. 2A represents a perspective view of a distribution means with a conduit 14 supplying particles which are distributed via tubes 11.

FIG. 3 represents a top view of an embodiment in which the distribution means comprises a single annular orifice 12. FIG. 3A shows a perspective view.

FIG. 4 shows a distribution means with continuous orifices 13 which are connected consecutively. In accordance with the invention, three walls 27 delimit three sectors 28 in the moving bed.

FIG. 5 shows a section of a parallelepipedal chamber 1 with walls 16 and 17, comprising two parallel planar screens 18 and 19 between which moving bed S circulates in a direction which is vertical in this case; fluid F supplied perpendicular to S into space 20 delimited by wall 16 and screen 18 traverses bed S and is collected in space 21 between wall 17 and screen 19 from which it exits.

Distribution means 22 via which particles S arrive is in this case parallelepipedal parallel to the screens and comprises a single orifice with a rectangular cross section for the flow of particles; this orifice has a plane of symmetry which is substantially parallel to the fluid outlet screen and covers the whole width of the bed. The bed thickness is defined with respect to the distance traversed by the fluid in a direction perpendicular to the plane of the outlet screen and the width corresponds to the horizontal dimension of the bed in a frontal plane parallel to the plane of the outlet screen.

FIGS. 6 and 7 show extraction means.

FIG. 6 shows reactor 1 with downward flowing moving bed S held between two screens 4 and 5.

Fluid F circulates from the periphery towards the centre and leaves via opening 9 in the chamber.

Solid particles S are extracted:

from extraction means 23 located at a distance of at most 0.5 e from outlet screen 5. Thickness e in this case is constant over the whole bed, as in the preceding figures (but this disposition is not limiting);

and front extraction means 24, which in this case is located at a distance of at least 0.5 e from the outlet screen.

The simplified top view shown in FIG. 7 shows a plurality of extraction means grouped into two series (25 and 26): the first (25), at a distance of at most 0.5 e from the outlet screen, and the second (26) at a distance of at least 0.5 e from the outlet screen.

The extraction means are tubes 23, 24, shown here with a circular cross section (although any other shape may be suitable), distributed evenly about two circular lines.

The cross sections, the number of means and their location varies as a function of the operator's requirements, in particular as a function of the displacement: velocity of the bed.

It can clearly be seen that the embodiment comprising sectors as described above and shown in FIG. 4 is thus very advantageous.

The distribution and extraction means have been shown separately for ease of comprehension, but the description of the invention shows that these means are advantageously combined in the same chamber.

We have not shown an extraction means from a chamber of the invention which comprises a single circular or rectangular orifice since it is produced in similar fashion to that of the distribution means of FIGS. 3 and 5, except that the position of the orifice with respect to the outlet screen is advantageously different, as well as as described above.

What is claimed is:

1. A chamber delimited by at least one wall, a bottom, and a roof, comprising:

at least one outer screen concentrically disposed inside the chamber, delimiting a moving bed of solid granular particles which circulates in the chamber in a direction substantially parallel to said outer screen;

at least one outlet screen, disposed within said outer screen and being concentric with said outer screen, said outlet screen defining a volume of a thickness e between said outlet screen and said outer screen in which volume the solid granular particles circulate;

at least one opening for the introduction of at least one fluid which circulates in said bed in a principle direction which is different direction to that of the ensemble of particles and leaves the bed via said at least one outlet screen;

at least two means, disposed at the bottom of the chamber, for extracting the particles from the chamber in at least two particle streams;

at least one opening, disposed at the roof of the chamber, for the introduction of particles into the chamber via a particle distributing means located above the moving bed of the particles, wherein said particle distributing means comprises at least one orifice for the stream of particles, each orifice being located at a distance of at least 0.6e from said outlet screen, wherein said means for extracting particles is located at a distance of at most 0.6e from the outlet screen for extracting an outflow enriched in fine or broken particles; and wherein said means for extracting particles further includes a catalyst outlet located at a distance of at least 0.6e from the outlet screen for extracting an outflow poor in fine or broken particles.

2. A chamber according to claim 1, comprising at least two extraction means for evacuating at least two particle streams.

3. A chamber according to claim 1, comprising at least one wall dividing the bed into sectors, and comprising above each sector at least one particle distribution means located at a distance of at least 0.6 e from the outlet screen, and comprising at least one extraction means at the lower portion of the bed in each sector.

4. A chamber as recited in claim 3, wherein said extraction means comprises two extraction means, a first extraction means located at a distance of at most 0.4 e from the outlet screen for extracting an outflow enriched in fine or broken particles, and a second extraction means located at a distance of at least 0.6 e from the outlet screen for extracting an outflow poor in fine or broken particles.

5. A chamber according to claim 1, in which at least a portion of the orifices of the distribution means is located at a distance of at least 0.75 e from the outlet screen.

6. A chamber according to claim 1, comprising a moving bed which is annular in shape, in which at least one distribution means comprises a single orifice of annular shape, with the same axis as the bed.

7. A chamber as recited in claim 6, wherein said extraction means comprises two extraction means, a first extraction means located at a distance of at most 0.4 e from the outlet screen for extracting an outflow enriched in fine or broken particles, and a second extraction means located at a distance of at least 0.6 e from the outlet screen for extracting an outflow poor in fine or broken particles.

8. A chamber according to claim 1, comprising a moving bed which is annular in shape, in which at least one extraction means comprises a single orifice which is annular in shape, with the same axis as the bed.

9. A chamber as recited in claim 8, wherein said particle distributing means comprises at least one orifice for the stream of particles, each orifice being located at a distance of at least 0.6 e from said outlet screen; wherein said means for extracting particles is located at a distance of at most 0.4 e from the outlet screen for extracting an outflow enriched in fine or broken particles; and wherein said means for extracting particles further includes catalyst outlet means located at a distance of at least 0.6 e from the outlet screen for extracting an outflow poor in fine or broken particles.

10. A chamber according to claim 1, comprising a moving bed which is parallelepipedal in shape, in which at least one distribution means comprises a single orifice with a rectangular cross section, with the same axis as the bed.

11. A chamber according to claim 1, comprising a moving bed which is parallelepipedal in shape, in which at least one extraction means comprises a single orifice with a rectangular cross section, with the same axis as the bed.

12. A chamber according to claim 1, in which at least one distribution means comprises at least one orifice which is elliptical in shape.

13. A chamber as recited in claim 12, wherein said orifice being located at a distance of at least 0.6 e from said outlet screen; wherein said means for extracting particles is located at a distance of at most 0.4 e from the outlet screen for extracting an outflow enriched in fine or broken particles; and wherein said means for extracting particles further includes catalyst outlet means located at a distance of at least 0.6 e from the outlet screen for extracting an outflow poor in fine or broken particles.

14. A chamber according to claim 1, characterized in that it is constituted by a reactor containing a moving bed of catalytic particles.

15. A chamber according to claim 14, characterized in that it constitutes a catalytic reforming reactor.

* * * * *